(12) United States Patent
Mitchell et al.

(10) Patent No.: US 7,805,523 B2
(45) Date of Patent: Sep. 28, 2010

(54) METHOD AND APPARATUS FOR PARTIAL UPDATING OF CLIENT INTERFACES

(76) Inventors: David C. Mitchell, 625 E. Technology Ave., Bldg. B, Suite B23, Orem, UT (US) 84097; Dale K. Mitchell, 625 E. Technology Ave., Bldg. B, Suite B23, Orem, UT (US) 84097; Bruce P. Mitchell, 625 E. Technology Ave., Bldg. B, Suite B23, Orem, UT (US) 84097; Scott E. Hamilton, 625 E. Technology Ave., Bldg. B, Suite B23, Orem, UT (US) 84097

( * ) Notice: Subject to any disclaimer, the term of this patent is extended or adjusted under 35 U.S.C. 154(b) by 1017 days.

(21) Appl. No.: 11/067,481

(22) Filed: Feb. 25, 2005

(65) Prior Publication Data

US 2005/0204047 A1    Sep. 15, 2005

Related U.S. Application Data

(60) Provisional application No. 60/553,679, filed on Mar. 15, 2004, provisional application No. 60/553,609, filed on Mar. 15, 2004.

(51) Int. Cl.
*G06F 15/16* (2006.01)

(52) U.S. Cl. .................. 709/228; 709/203; 709/250

(58) Field of Classification Search ......... 709/202–203, 709/250, 220–221, 227–228
See application file for complete search history.

(56) References Cited

U.S. PATENT DOCUMENTS

| | | | |
|---|---|---|---|
| 5,448,740 A | 9/1995 | Kiri et al. | 717/155 |
| 5,710,925 A | 1/1998 | Leach et al. | |
| 5,796,394 A | 8/1998 | Wicks et al. | |
| 5,842,220 A | 11/1998 | De Groot et al. | |

(Continued)

FOREIGN PATENT DOCUMENTS

EP    1 081 918 A2    3/2001

(Continued)

OTHER PUBLICATIONS

International Search Report for Patent Application No. PCT/US2005/08646, dated Jan. 24, 2006 (1 page).

(Continued)

*Primary Examiner*—Bharat N Barot
(74) *Attorney, Agent, or Firm*—Goodwin Procter LLP

(57) ABSTRACT

A method and apparatus for partial updating of client interfaces in a client-server environment. The client updates the corresponding server-side through a middleware "engine." Individual interface element change requests may be queued. Programmatically defined events may trigger processing of the change request queue on the client, resulting in partial updating of an interface container, such as a Web page or XML document, in the client interface context. Processing may occur on the server, where resultant client update requests are likewise queued. Alternative programmatically defined events may trigger the return of the server change queue to the client. Only those elements of the interface container affected by changes in the queue are updated. This partial updating method replaces the need for refreshing an entire interface, thus affording a more desktop-like look and feel.

31 Claims, 5 Drawing Sheets

U.S. PATENT DOCUMENTS

| | | | | |
|---|---|---|---|---|
| 5,864,862 | A | 1/1999 | Kriens et al. | 707/103 R |
| 5,872,973 | A | 2/1999 | Mitchell et al. | 395/685 |
| 5,978,834 | A | 11/1999 | Simonoff et al. | 709/203 |
| 6,005,568 | A | 12/1999 | Simonoff et al. | 715/744 |
| 6,043,815 | A | 3/2000 | Simonoff et al. | 715/744 |
| 6,049,673 | A | 4/2000 | McComb et al. | 717/164 |
| 6,061,797 | A | 5/2000 | Jade et al. | 713/201 |
| 6,085,231 | A | 7/2000 | Agraharam et al. | |
| 6,088,739 | A | 7/2000 | Pugh et al. | |
| 6,145,120 | A | 11/2000 | Highland | 717/106 |
| 6,169,992 | B1 | 1/2001 | Beall et al. | 707/103 |
| 6,182,277 | B1 | 1/2001 | DeGroot et al. | 717/115 |
| 6,252,588 | B1 | 6/2001 | Dawson | |
| 6,275,848 | B1 | 8/2001 | Arnold | |
| 6,292,933 | B1 | 9/2001 | Bahrs et al. | 717/107 |
| 6,304,636 | B1 | 10/2001 | Goldberg et al. | |
| 6,304,918 | B1* | 10/2001 | Fraley et al. | 719/322 |
| 6,331,855 | B1 | 12/2001 | Schauser | |
| 6,334,141 | B1* | 12/2001 | Varma et al. | 709/203 |
| 6,356,933 | B2* | 3/2002 | Mitchell et al. | 709/203 |
| 6,370,681 | B1 | 4/2002 | Dellarocas et al. | 717/110 |
| 6,377,973 | B2 | 4/2002 | Gideon et al. | 709/203 |
| 6,424,948 | B1 | 7/2002 | Dong et al. | |
| 6,434,598 | B1 | 8/2002 | Gish | 709/203 |
| 6,513,157 | B1 | 1/2003 | Glass | |
| 6,640,249 | B1 | 10/2003 | Bowman-Amuah | |
| 6,654,784 | B1 | 11/2003 | Wei | 709/203 |
| 6,654,932 | B1 | 11/2003 | Bahrs et al. | 715/507 |
| 6,675,228 | B1 | 1/2004 | Bahrs et al. | 719/318 |
| 6,678,726 | B1* | 1/2004 | Moshaiov | 709/221 |
| 6,687,745 | B1 | 2/2004 | Franco et al. | 709/219 |
| 6,748,570 | B1 | 6/2004 | Bahrs et al. | 715/526 |
| 6,766,333 | B1 | 7/2004 | Wu et al. | 707/201 |
| 6,779,021 | B1 | 8/2004 | Bates et al. | |
| 6,779,155 | B1 | 8/2004 | Bahrs et al. | 715/526 |
| 6,779,177 | B1 | 8/2004 | Bahrs et al. | |
| 6,782,508 | B1 | 8/2004 | Bahrs et al. | 715/526 |
| 6,795,851 | B1 | 9/2004 | Noy | |
| 6,795,968 | B1 | 9/2004 | Sobeski et al. | |
| 6,806,825 | B2 | 10/2004 | Andrusiak et al. | 342/185 |
| 6,829,771 | B1 | 12/2004 | Bahrs et al. | 719/318 |
| 6,836,885 | B1 | 12/2004 | Buswell et al. | |
| 6,847,987 | B2 | 1/2005 | Case et al. | |
| 6,862,711 | B1 | 3/2005 | Bahrs et al. | 715/526 |
| 6,880,126 | B1 | 4/2005 | Bahrs et al. | |
| 6,883,172 | B1 | 4/2005 | Angeline et al. | |
| 6,886,046 | B2 | 4/2005 | Stutz et al. | 709/246 |
| 6,886,169 | B2 | 4/2005 | Wei | 719/316 |
| 6,886,170 | B1 | 4/2005 | Bahrs et al. | 719/318 |
| 6,888,927 | B1 | 5/2005 | Cruickshank et al. | |
| 6,897,833 | B1 | 5/2005 | Robinson et al. | |
| 6,901,554 | B1 | 5/2005 | Bahrs et al. | 715/526 |
| 6,901,595 | B2 | 5/2005 | Mukundan et al. | 719/316 |
| 6,920,480 | B2 | 7/2005 | Mitchell et al. | 709/203 |
| 6,925,631 | B2 | 8/2005 | Golden | 717/115 |
| 6,961,735 | B2 | 11/2005 | Gargya et al. | |
| 6,990,534 | B2* | 1/2006 | Mikhailov et al. | 709/250 |
| 7,000,008 | B2* | 2/2006 | Bautista-Lloyd et al. | 709/203 |
| 7,010,608 | B2 | 3/2006 | Garg et al. | |
| 7,035,944 | B2 | 4/2006 | Fletcher et al. | |
| 7,089,287 | B2 | 8/2006 | Bellotti et al. | |
| 7,233,972 | B2* | 6/2007 | Minow | 709/203 |
| 7,472,401 | B2 | 12/2008 | Luo et al. | |
| 2001/0047406 | A1 | 11/2001 | Araujo et al. | 709/223 |
| 2002/0165993 | A1 | 11/2002 | Kramer | |
| 2003/0046587 | A1 | 3/2003 | Bheemarasetti et al. | 726/4 |
| 2003/0140090 | A1* | 7/2003 | Rezvani et al. | 709/203 |
| 2003/0182363 | A1 | 9/2003 | Clough et al. | 709/203 |
| 2003/0182469 | A1 | 9/2003 | Lok et al. | 719/328 |
| 2003/0191799 | A1 | 10/2003 | Araujo et al. | 709/203 |
| 2003/0220968 | A1* | 11/2003 | Hickson et al. | 709/203 |
| 2003/0229672 | A1 | 12/2003 | Kohn | |
| 2004/0021679 | A1 | 2/2004 | Chapman et al. | 715/700 |
| 2004/0088409 | A1 | 5/2004 | Braemer et al. | 709/225 |
| 2004/0221293 | A1 | 11/2004 | Srinivas et al. | |
| 2005/0086197 | A1 | 4/2005 | Boubez et al. | |
| 2005/0086608 | A1 | 4/2005 | Roessler | 715/764 |
| 2005/0240758 | A1 | 10/2005 | Lord et al. | |
| 2005/0251551 | A1 | 11/2005 | Mitchell et al. | 709/203 |
| 2005/0262357 | A1 | 11/2005 | Araujo et al. | |
| 2006/0085750 | A1 | 4/2006 | Easton, et al. | |

FOREIGN PATENT DOCUMENTS

| | | |
|---|---|---|
| WO | WO-03073275 | 9/2003 |
| WO | WO-03098890 A1 | 11/2003 |

OTHER PUBLICATIONS

International Search Report for International application No. PCT/US2005/08667, dated May 8, 2007.

Written Opinion of the International Searching Authority for International application No. PCT/US2005/08667 dated May 8, 2007.

Bishop, P. et al., "Java Tip 67: Lazy instantiation," JavaWorld.com, Feb. 1, 1999, javaworld.com/javatips/jw-javatip67.html, retrieved Feb. 23, 2010.

Buchi, M. et al., "Generic Wrappers," Center for Computer Science, ECOOP 2000, LNCS, 1850, pp. 201-225.

Chappell, D., "Understanding ActiveX OLE," 1996, pp. 70-72.

International Search Report, PCT/US05/037701, dated Dec. 14, 2006, 2 pages.

International Preliminary Report on Patentability, PCT/US05/037701, Apr. 24, 2007, 1 page.

International Search Report, PCT/US07/001759, dated Jul. 23, 2007, 6 pages.

Jaworski, J., Java Developer's Guide, 1996 First Edition, pp. 120-121.

Khalaf, R. et al., "On Web Services Aggregation," Springer Berlin, Published 2003, vol. 2819/2003, pp. 1-13.

Marvie, R. et al., "Towards a Dynamic CORBA Component Platform," International Symposium on Distributed Objects and Applications, 2000, Proceedings, DOA '00, Publication Date: 2000 On pp. 305-314.

Mennie, D.W. et al, "An Architecture to Support Dynamic Composition of Service Components and its Applicability to Internet Security," Carelton University, Ottawa, Ontario, Canada, Oct. 6, 2000.

Rosenberg, J. et al., "Getting SIP through Firewalls and NATs." Internet Citation, [Online] Feb. 22, 2000, XP002167710, retrieved from the Internet: URL: softarmor.com/sipwg/draft-rosenberg-sip-firewalls-00.txt>[retrieved on May 18, 2001] paragraph [0005]; figures 2, 3.

RSA Data Security, Inc. Public-Key Cryptography Standards (PKCS), RSA Laboratories: "PKCS #7: Cryptographic Message Syntax Standart," Version 1.5: RSA Laboratories Technical Note, Nov. 1, 1993, pp. 1-30, XP002207635.

Supplementary European Search Report for EP 05728118, completion date of search Mar. 27, 2009 (3 pages).

Wang et al., Evaluating Meta-Programming Mechanisms for ORB Middleware, IEEE Communications Magazine, Oct. 2001 (pp. 102-113).

Wang et al., The Design and Performance of Meta-Programming Mechanisms for Object Request Broker Middleware, Department of Computer Science, Washington University (pp. 1-17).

Wohlstadter et al., DADO: Enhancing Middleware to Support Cross-cutting Features in Distributed, Heterogeneous Systems, University of California, Davis, Center for Software Systems Research, Department of Computer Science (13 pages).

Written Opinion of the International Searching Authority, PCT/US05/037701, Dec. 14, 2006, 6 pages.

Written Opinion of the International Searching Authority, PCT/US07/001759, Sep. 17, 2007, 13 pages.

\* cited by examiner

METHOD AND APPARATUS FOR PARTIAL UPDATING OF CLIENT INTERFACES

CROSS-REFERENCE TO RELATED APPLICATIONS

This application claims the benefit of priority from U.S. Provisional Patent Application Ser. No. 60/553,679, filed on Mar. 15, 2004, and U.S. Provisional Patent Application Ser. No. 60/553,609, filed on Mar. 15, 2004, the specifications and figures of which are hereby incorporated by reference.

FIELD OF THE INVENTION

This invention relates to the general field of client/server computing, and more specifically to partial updating of client interfaces.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights.

BACKGROUND

The present approach to delivery of updates to client interfaces is inadequate for some client-server applications. For example, when an element of a served interface container (such as a Web page, XML document or other container structure) is invoked within a client container context, a server is prompted to provide a new interface container to update the client interface. A problem with such an approach to updating a client interface is that while regenerating an entire interface container may be satisfactory for presenting simple content, it is poorly suited for interactive applications, particularly where one or more elements of the interface container are unchanged between updates.

This problem and others may be better understood by considering a specific client-server interface example, such as the delivery of Web page updates to a Web browser client. Generally, when a hyper-link or other input to a browser client is invoked, the pertinent Web server receives a command to generate a complete Hyper-Text Markup Language (HTML) page. This HTML Web page is then delivered to the client and completely updated on the browser.

Traditional Approaches to Web Page Refreshing

The Internet was originally conceived of and developed as a virtual environment that electronically mimics scholarly journals, articles, books, and other real world paper-based media. In such a context, whole page replacement and updating (refreshing) makes sense and is even desirable, just as when reading a book, it is desirable to turn an entire page at a time, and not small sections of a page.

On the other hand, such a whole page refreshing-based paradigm makes little sense for traditional business software. In a software application, a user may change only one item at a time and this change may affect only two or three other items in the user interface, not the entire application surface. For example, to determine a value using a calculator (whether in the real world, or virtually, through software), most often the user types in an integer, depresses a function button, types in a second integer, depresses another function button, and then views the final value. In such a case it would make little sense for the entire surface of the calculator to disappear only to be redrawn again each time the user clicks a function button. The only data a user is interested in seeing change is the data located in the calculator's data entry field. Updating anything else is a waste of time and a visual annoyance. Unfortunately, just such a data update delivery method typically confronts Web-based software application users today.

Traditional Internet Client/Server Model

In the client/server model as it is traditionally applied on the Internet, the client consists of a computer hosting a Web browser where user interaction with the application takes place. The server is often a separate computer located elsewhere and forming a part of the Internet. In order to access the Internet, the server computer must have a Web server installed that makes communication across a network, such as the Internet, possible. Web servers contain Web pages that they "serve" or make available to any client that connects to them using an appropriate Internet communications protocol. The most common Internet communications protocol is the Hyper Text Transport Protocol (HTTP).

Often Web servers act as middleware (software that enables communications between two other distinct pieces of software) to connect the user interface on the browser to another server piece (located "behind" the Web server) where the processing for a Web application occurs. The application server provides the back-end processing of the application. A user interacts with a Web-based application through a user interface displayed on the browser. This "back-end" server is where the "business logic" of a Web-based application is processed.

In addition to communicating with the browser through the Web server, the server side of a Web-based application may itself also function as middleware as it communicates with still other middleware data or applications, and to other back-end services such as Simple Object Access Protocol (SOAP) services, Web services, database services, or "legacy" applications (applications that are not themselves Web-enabled). SOAP services encode the information in Web service request and response messages before sending them over a network. Web services are a standardized way of integrating Web-based applications using the Extensible Markup Language (XML), SOAP, Web Services Description Language (WSDL) and Universal Description, Discovery, and Integration (UDDI) open standards over an Internet protocol backbone.

State and Stateless Issues

Any kind of back-end component has a certain state at any given moment. Data that exists in such a back-end component does so in a certain condition and has arrived at that condition due to various changes and computations achieved in part from user input. The Internet is intrinsically stateless because each request for a new Web page is processed without any memory of previous pages requested. The protocols that enable Internet communications are stateless. It is because of this stateless nature that Web pages traditionally require a whole page refresh to portray state changes on the server. This is one of the chief drawbacks to the HTTP protocol. The ability to manage and propagate state throughout an application session is what gives desktop applications their power. Because maintaining state is extremely useful, programmers have developed a number of techniques to add state to the World Wide Web environment. These include server Application Programming Interfaces (APIs), such as Netscape Application Programming Interface (NSAPI) and Internet Server Application Programming Interface (ISAPI), and the use of "cookies."

When a Web browser or another process experiences input that affects state on the server for its related application, there needs to be a way to communicate server state changes to appropriate locations in the application interface on the browser. Traditionally, these state changes demand whole page updating of the browser because while both the client and the server are "stateful," the protocols most often used to communicate between the client and server are "stateless"—that is such protocols can only request a new Web page to be delivered to the client. Stateless protocols cannot convey information about all the changes that have been made on the browser throughout the application session up to that point. This inability to keep track of the past and current states (conditions) in the application means that a Web application developer who wants the ability to track state throughout the life of an application is left wanting.

Today, many of the most widely used Internet applications are those which depend upon backend database storage and retrieval. The methodologies for retrieving and storing database queries are themselves inherently stateless. This results in a situation where both the backend service and the application interface lack the ability to maintain state. Current middleware solutions can tend to act as a transparent "pass through" of stateless getting and setting of data. The problem with such an approach is that for more powerful applications using multiple back end resources, tracking the state of a given data element may be very important to the proper functioning of the entire application. Unfortunately, current techniques are not adequate to this challenge.

For example, because traditional database query models are "unaware" of the scope of change created by isolated user input, even a single change on most form-based Web applications requires a new query of the database and a subsequent whole page update when the database query is returned by the server. There is no mechanism in place to verify a need for a database query in the first place, and certainly no way to update only those areas affected by that single change. Stateless protocols do not provide a method for tracking the state of individual portions of data located on a given Web application interface.

SUMMARY OF THE INVENTION

The present invention is a method and apparatus for partial updating of client interfaces. Embodiments of the invention may be applied to any client-server system having a server configured to serve container structures having multiple interface elements, and a client execution context configured to process such container structures in support of an interface. Dynamic interface behavior is provided by updating interface elements as needed, without requiring that entire container structures be refreshed.

In accordance with one embodiment of the invention, a method for providing partial updating between a server and a client interface context comprises: providing a client interface context with an interface container from a server; tracking state of multiple interface elements in the interface container; based on a server state, determining one or more application-based changes to one or more of the interface elements; and applying the one or more application-based changes to the one or more interface elements in the client interface context.

In accordance with another embodiment of the invention, the apparatus of the invention comprises: a client interface context comprising an interface container having multiple interface elements, wherein the client interface context is configured to present an interface based on the interface container, and wherein the client interface context is configured to update a portion of the interface when the state of an associated interface element is changed; a server configured to serve the interface container, the server comprising multiple server element proxies respectively associated with the multiple interface elements; wherein each server element proxy is configured to track a respective interface element state and process server-side changes directed to that interface element state.

As an example implementation of the invention, one or more embodiments may provide a method and apparatus for updating individual portions of a Web page both on a browser-client and on a Web server. In this implementation, the client interface context is implemented by a Web browser or browser-client, and the server is a Web server providing interface containers in the form of Web pages containing interface elements such as HTML tags. The browser-client may update the corresponding server-side through a middleware "engine." Likewise, the server may update the corresponding browser-client through the same middleware engine. Input triggers may cause change requests to be queued. Programmatically defined events trigger processing of the change request queue on the client, which may result in partial updating of a Web page. Processing may occur on the server, where resultant client update requests are likewise queued. Alternative programmatically defined events may trigger the return of the server change queue to the client. Only those portions of the Web page affected by changes in the queue are updated. This partial page updating replaces the need for entire Web page refreshing, thus affording a Web application of the present invention a more desktop-like look and feel.

The flexible middleware "machinery" of the invention may track and communicate changes in state between a client and server in a Web application using the present invention. The invention encompasses a "middleware engine" that can track state changes across "stateless" protocols such as HTTP. Such a state tracking method may be comprised of a system of programmatic rules that determine when and how partial Web page changes occur and are communicated between the server and client. The present invention does not require the use of "hard coding" to update a given portion of the page, instead allows a general purpose method to achieve, for example, Document Object Model (DOM) manipulation. In one embodiment of the present invention a Web application may communicate with a Web server through a binary interface, and may update information based on Uniform Resource Locator (URL) links that can be particularized to the "subtag" level of individual HTML tags. The present invention is flexible such that the Middleware method of the present invention employed may accommodate both stateless and "stateful" connections. Embodiments of the present invention can be used in conjunction with existing technologies such as Active Server Page (ASP) and Java Server Page (JSP) for server-side Web page creation without the need to modify such technologies. Embodiments of the present invention need not create a monolithic Web page, as those embodiments can support a Web page composed of multiple discrete Web pages, each capable of being updated independent of the containing Web page.

Embodiments of the present invention may further support "page proxies" that may be used to create an abstraction of the Web pages that appear on the client. This feature allows greater flexibility in creating and updating Web pages dynamically at runtime. One embodiment of the invention, for example, pre-parses the code for the Web pages on the server at the page proxy level. The present invention allows a single client to programmatically update state across multiple Web pages. Because each client connecting to the server may have a single change queue, the change queue spans multiple Web pages. In other words, an application using the present invention may act as an instantiated server shell.

The method of the present invention works equally well with both asynchronous and synchronous server models. In a purely asynchronous model the middleware "engine" may be driven through user interactivity. Alternatively, in a synchronous model (for example, where you have a data streaming socket connection), a middleware engine of the present invention may utilize a trigger-based mechanism at the socket layer. Embodiments of the present invention may provide the ability to control update times and also allow for asynchronous updates, even in "multiple-select" operations. The present invention further enables dynamic runtime replacement or updating of HTML hyperlink references, sometimes called <a> tags.

DETAILED DESCRIPTION OF THE INVENTION

Figure 1:
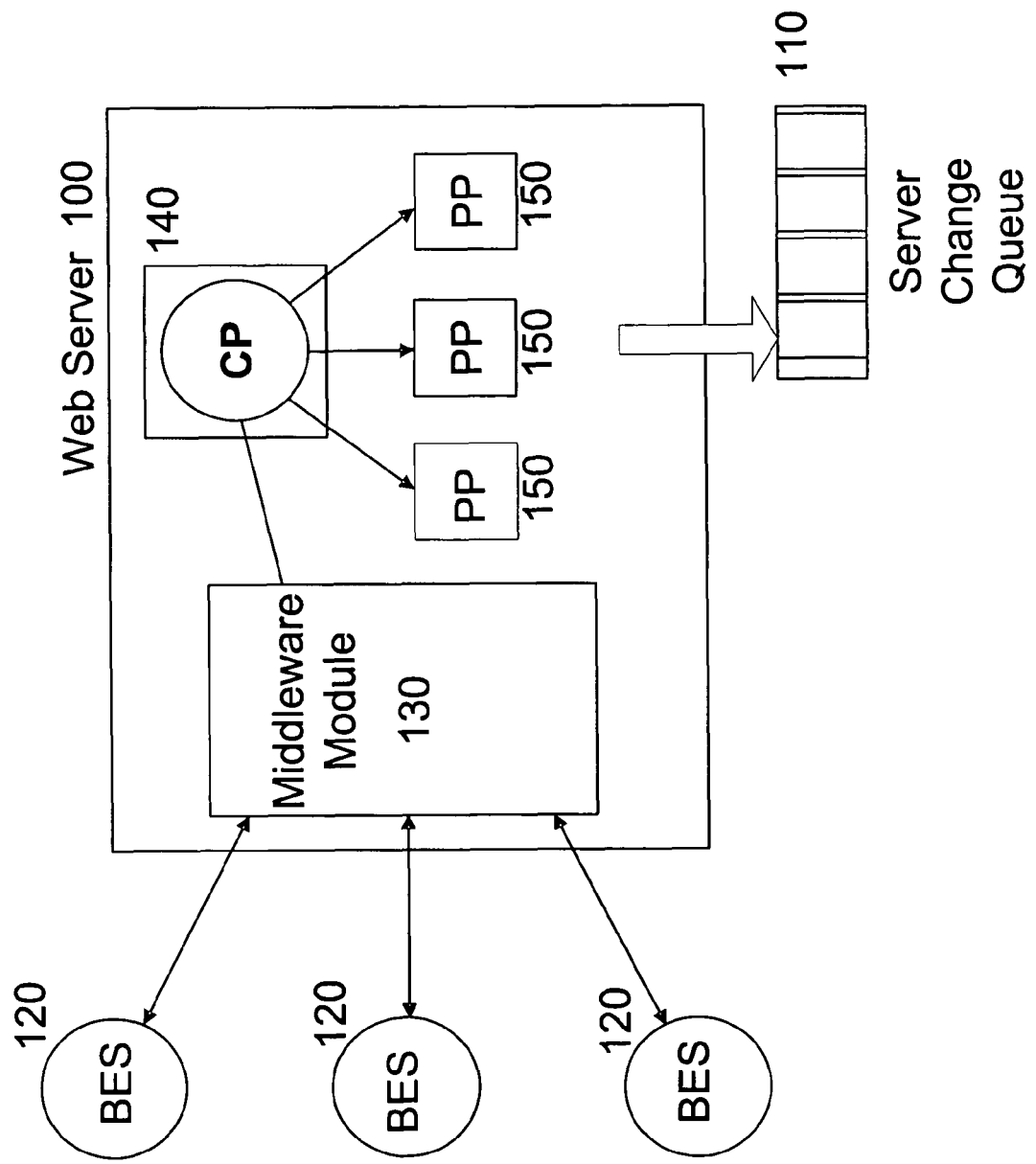
FIG. 1 illustrates the server side of a partial page updating method on a Web server in one embodiment of the invention.

The invention is a method and apparatus for partial updating of client interfaces in a client-server system. In the following description, numerous specific details are set forth to provide a more thorough description of the invention. It will be apparent, however, to one skilled in the art, that the invention may be practiced without these specific details. In other instances, well known features have not been described in detail so as not to obscure the invention.

In one or more embodiments of the invention, the client provides an interface having information and/or behavior supported by a server. As part of the client execution, the client provides an interface context within which server data is processed to present or "render" the interface. The server data is initially communicated to the client and loaded into the interface context as an interface container structure. Multiple interface elements may be contained within the interface container structure, and one or more of those interface elements may include or reference additional interface container structures having further interface elements contained therein. Each interface element may provide information and/or function associated with a particular portion of the presented interface (e.g., a particular spatial region of a display, a particular channel of audio, a particular temporal aspect of the interface and/or a particular attribute or function of the rendering process).

To provide a dynamic and seamless presentation, embodiments of the invention may handle changes to the interface with the finest atomicity possible, i.e., at the level of individual interface elements and sub-elements (e.g., individual attributes of an interface element, or interface elements nested within other interface elements). Thus, rather than refreshing a complete interface container of elements with each change of the interface, individual element and sub-element change requests are generated and applied as needed.

Interface changes may be initiated by the server in accordance with application functionality provided through the server; interface changes may also be initiated through local input to the client (e.g., user input, device/sensor input or input from a separate process).

Some change requests may not require immediate action. For example, a change to a first interface element may not affect the presented interface until a change is made to a second interface element. In such cases, the communication and application of those change requests may be deferred. Change queues may be implemented at the server and the client to aggregate deferred server-based and client-based change requests, respectively, until application of one or more of those change requests is required. Other events may also trigger transmission of a change queue (e.g., expiration of a specified time period since last change queue transmission, aggregation of change requests to a specified queue limit, etc.).

In one or more embodiments, the server (or a module associated with the server) may implement a nested proxy structure corresponding to the data served to a client (or clients). For example, the server may create or obtain a client proxy associated with the respective client interface context, a container proxy associated with a given interface container, and interface element proxies associated with the interface elements within the interface container. The nested proxy structure may then be used to track changes and generate or process change requests.

To better illustrate the apparatus and method of the invention, an example application of the invention to the Web server/browser context is provided below. One of ordinary skill in the art will recognize that the method and apparatus of the invention are not limited to such an application context. The general concepts described herein may be advantageously applied to any client-server system.

Embodiments of the present invention may include a Web server "adapter" or "middleware engine." This Web server middleware engine may be tailored to different kinds of platforms, or it could be a custom Active Server Pages (ASP) script, or a Java 2 Platform, Enterprise Edition (J2EE) engine; or the technology may be independent of the logic in which the server is implemented. Various aspects of the present invention are described in terms of one such embodiment. It should be noted that while the present invention is described in terms of such a middleware module, it is quite possible and indeed preferred to create a Web server that encapsulates the method of the present invention natively. It should also be noted that various elements of the present method occur in relation to triggering events. Triggering events that may cause, for example, a change queue to be sent to a client or server in the present invention may include an input event, a programmatic trigger, or other event or state change. For purposes of illustration this description will discuss a programmatic trigger as a trigger event. However, one of ordinary skill in the art will realize that these and other types of events could also act as such a trigger, and are therefore encompassed in the present invention.

The invention is described in terms of a middleware engine which can be implemented on the server side; however, embodiments of the invention could also as easily be implemented as a custom client using plug-in code, applet code, JavaScript or HTML, and the invention is therefore not limited to server side, client side or middleware only implementations. One of skill in the art will also be aware that while Web servers and clients are often executed on separate computers they may also be run on a single computer, on a local area network, on a wide area network, across the Internet, or in any other networking environment supporting the client-server paradigm. Therefore, the present invention is not limited to processes which communicate "across a network connection." The present invention encompasses systems in which client and server communicate by any method, for example, intra-processor task communications, wireless communications and infrared communications technology may all support the client-server interface which underlies the invention described here.

FIG. 1 shows an example of the server side processes of an embodiment of the present invention. Web server 100 includes Middleware Module 130 that can access various types of Back-End Services (BES) 120. Web services, SOAP services, and database services are examples of Back-End Services 120 accessible from Middleware Module 130. Middleware Module 130 may create Client Proxy 140 every time a new client accesses Web Server 100. Client Proxy 140 in turn creates Page Proxy 150 for each new Web page that a user invokes on the originating client. As Middleware Module 130 processes state changes, it may add them to Server Change Queue 110. Server Change Queue 110 may be implemented in varying embodiments to provide flexibility. Server Change Queue 110 could be a linked list, an array, or any kind of data structure that can maintain a set of changed items. Order of items in Server Change Queue 110 may or may not be important, depending on the type of partial page updating the designer chooses to implement. Data structure design choices for queue structures are well known to those of skill in the art, and therefore not detailed here. Further, Client Proxy 140 may have its own Server Change Queue 110 so that only those state changes pertinent to a given client are sent to that client. For example, in one embodiment of the invention a programmatic trigger event may cause Server Change Queue 140 to be sent to a client. Other types of trigger events are well known in the art and will work as well.

Figure 2:
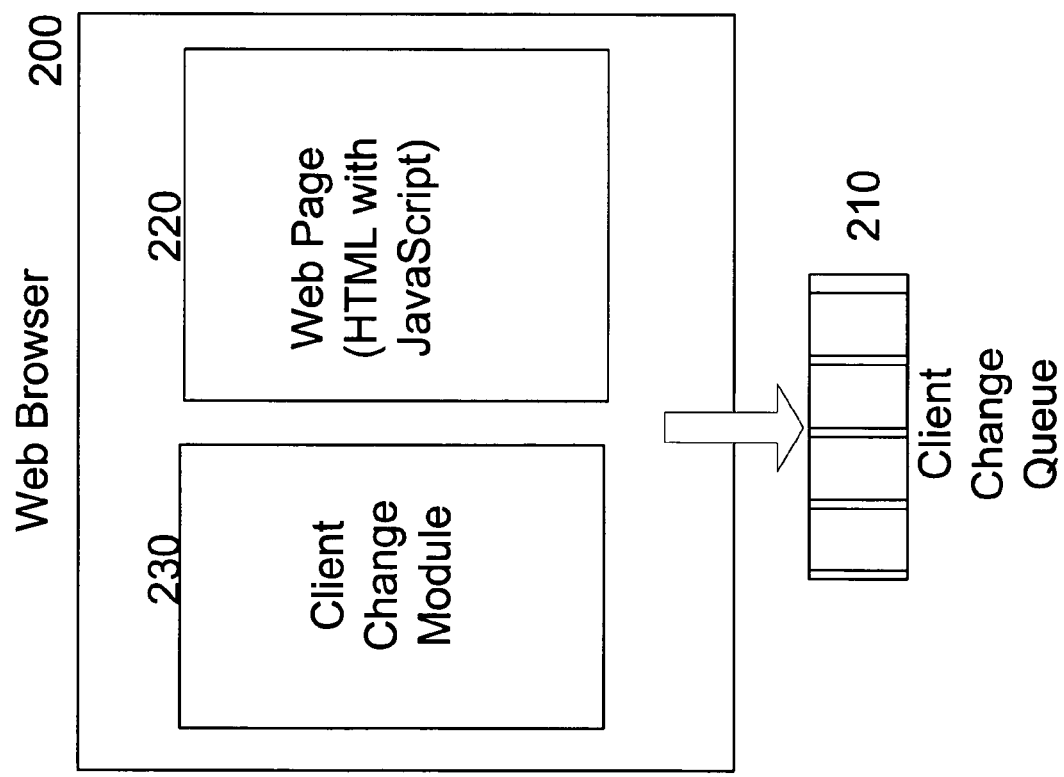
FIG. 2 illustrates the client side of a partial page updating method on a Web browser in one embodiment of the invention.

FIG. 2 illustrates Web browser 200 in accordance with one or more embodiments of the invention. Web browser 200 may interface to, for example, Client Change Module 230 and Web Page 220 (which may include a combination of HTML with a library of JavaScript code.) When user interaction causes state changes on the client side, the changes may be added to Client Change Queue 210. Upon a triggering event, for example a programmatic trigger, Client Change Queue 210 is sent across a communication connection to the server side (see FIG. 4).

Figure 3:
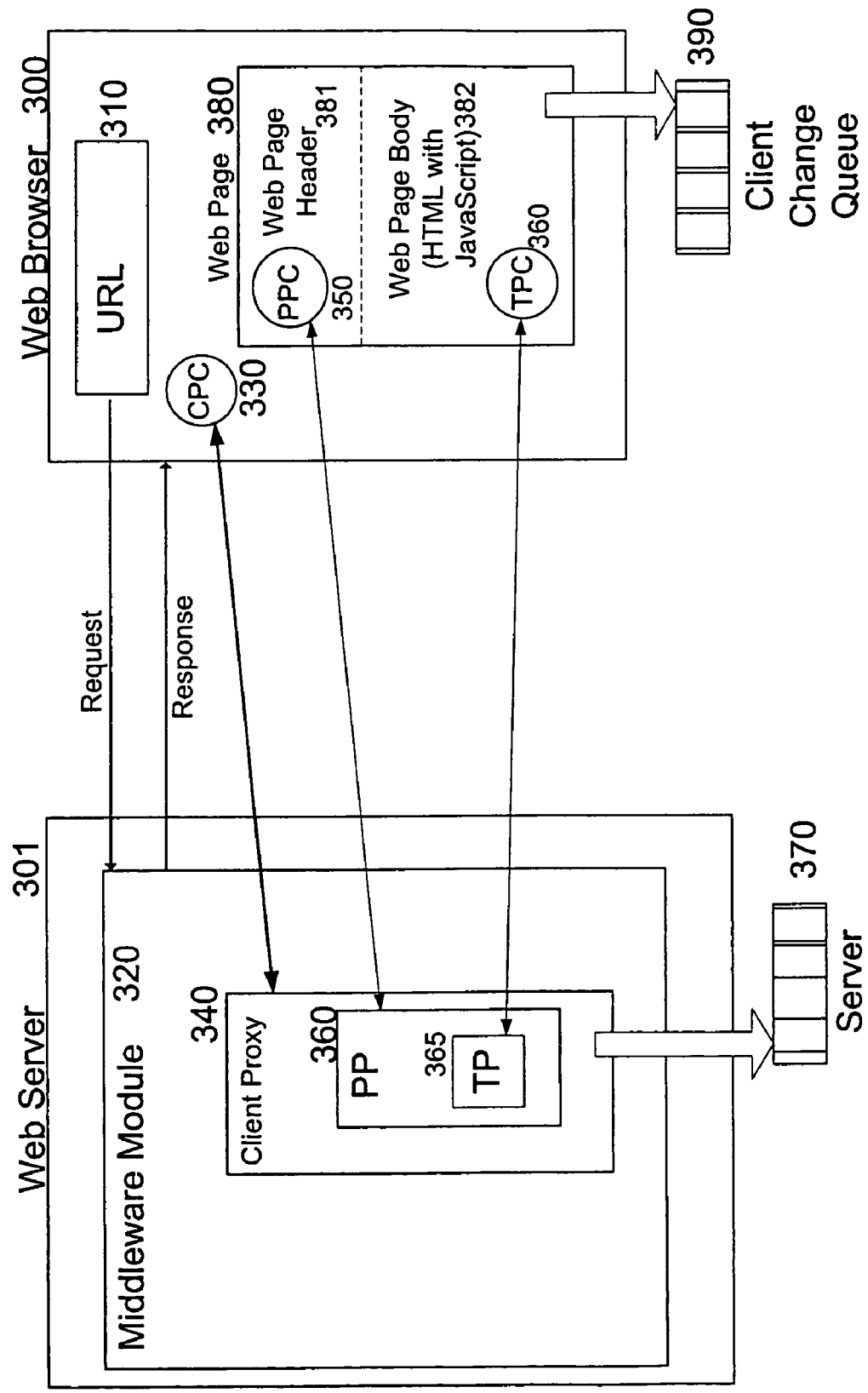
FIG. 3 illustrates an example of an initial connection from a client to a server based application in one embodiment of the invention.

Embodiments of the present invention may include a state change management (or process management) and propagation engine. State change management and propagation engines manage changes in state on the server side of an application and forward such information to the client. User input may be another source of change in state on the client. Such input may be passed on to the server side for processing. This process may begin following initialization of the application with respect to a particular client. FIG. 3 demonstrates an example of what may occur the first time that a client browser invokes a URL that accesses a Web application in an embodiment of the present invention.

As used herein, the term "cookies" is used to refer to information maintained to aid the middleware in identifying or tracking client state. However, cookies are traditionally understood as a block of data stored on the client and often written to disk, for use at the browser level. While an embodiment of the present invention may use a cookie in a traditional fashion, the invention described herein may also use cookies to facilitate state tracking at the element or partial page level. Thus, in the present invention there may be many cookies for a single visual page, and such cookies may never be written to disk on the client.

First Time Connection

As illustrated in FIG. 3, in one embodiment of the present invention an initial access to Middleware Module 320 from Web (client) browser 300 may proceed when activation of a hyper-link invokes the Middleware method of the present invention via a Web server as in the following example: the Web Server 301 may pass URL 310 to Middleware Module 320 requesting a Web page. Middleware Module 320 may create Client Proxy (CP) 340. CP 340 may create Page Proxy (PP) 360. PP 360 may create Tag Proxy (TP) 365; CP 340 may also create a Server Change Queue 370 to pass changes in application state to the client. Middleware Module 320 may then respond to the original Web page request by passing back to the requesting client (Web Browser 300) a Web Page 380 that may be generated in Web Browser 300. Client Change Queue 390 may also be generated at this time. As Web Page 380 is generated on Web Browser 300 a Client Proxy Cookie (CPC) 330 may be created in Web Browser 300. Page Proxy Cookie (PPC) 350 may be created in the Web Page Header 381. A Tag Proxy Cookie (TPC) 360 may be created within Web Page Body 382 of Web Page 380 which may include HTML and a library of JavaScript; the JavaScript may generate state changes to pass to Client Change Queue 390. State changes to Web Page 380 may be collocated in Client Change Queue 390 together with state changes from any other Web pages created on Web browser 300. Client Change Queue 390 may pass changes in application state to the server portion of the application.

Subsequent Interactions

Figure 4:
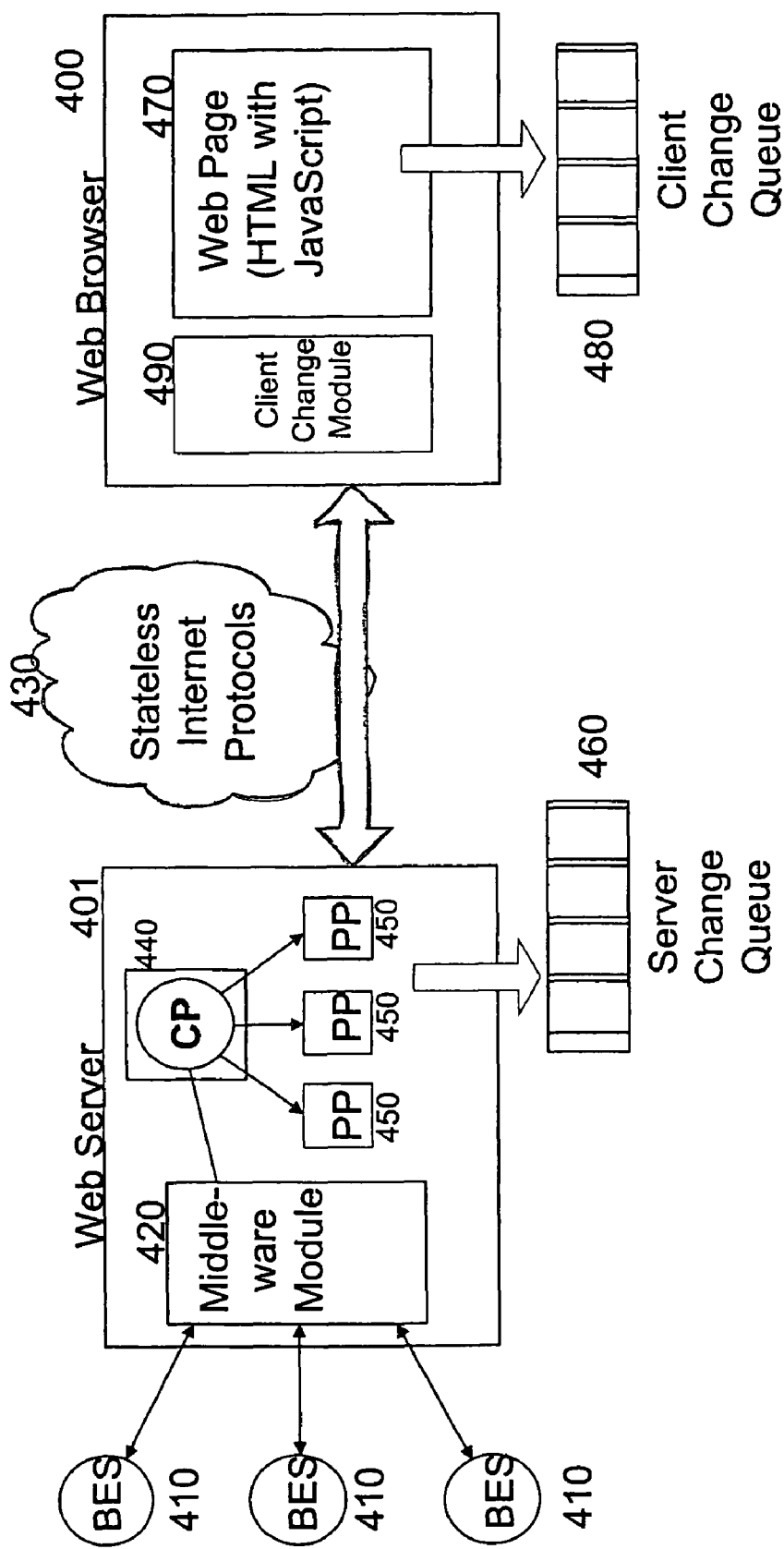
FIG. 4 illustrates subsequent state change communications between a client and a server in one embodiment of the invention.

User interaction with the client may generate state changes to be handled in one embodiment of the present invention by the Middleware Module 420 on the server and Client Change Module 490 on the client. FIG. 4 illustrates such processing in one embodiment of the invention.

The state changes caused by user input in the Web browser client may be handled by Client Change Module 490. Changes that affect state on the server may be stored in Client Change Queue 480 until a programmatic or other trigger sends the entire Client Change Queue 480 across a communication mechanism such as the Internet to the server side of the application. "Stateful" changes may be communicated to Client Proxy (CP) 440 through Stateless Internet Protocols 430, such as HTTP because Middleware Module 420 on Web Server 401 processes these changes. This may result in interactions with Back-End Services (BES) 410 such as Web services or database services. If these interactions produce additional application state changes, these changes (and any others generated on the Web server) may be added to Server Change Queue 460 associated with the appropriate Client Proxy 440. Whenever state change indicates the need Client Proxy 440 may generate one or more additional Page Proxies (PP) 450 to provide other Web pages.

The following sections provide a more detailed look at the principles by which middleware state tracking and updates may be managed both on the client and on the server.

Page Proxies

In an application using the Middleware method of the present invention, each Web page served up to a client machine is really a complex of aggregated Web pages, many of which are embedded like Russian dolls within yet other Web pages or other interactive content. On the client however, in one embodiment of the present invention, all of the embedded pages may appear to the user as a single page, because Middleware Module 320 may combine the embedded pages into a single page to present to the user. This combination reflects the state tracking performed by Middleware Module 320. Thus, the state maintained by Middleware Module 320 determines the form of the Web page presented to the user. Each of these embedded pages is highly optimized for the tracking and reporting of state changes on the client. It is the job of the page proxies to track and manage all of the state changes pertinent to a given client.

Figure 5:
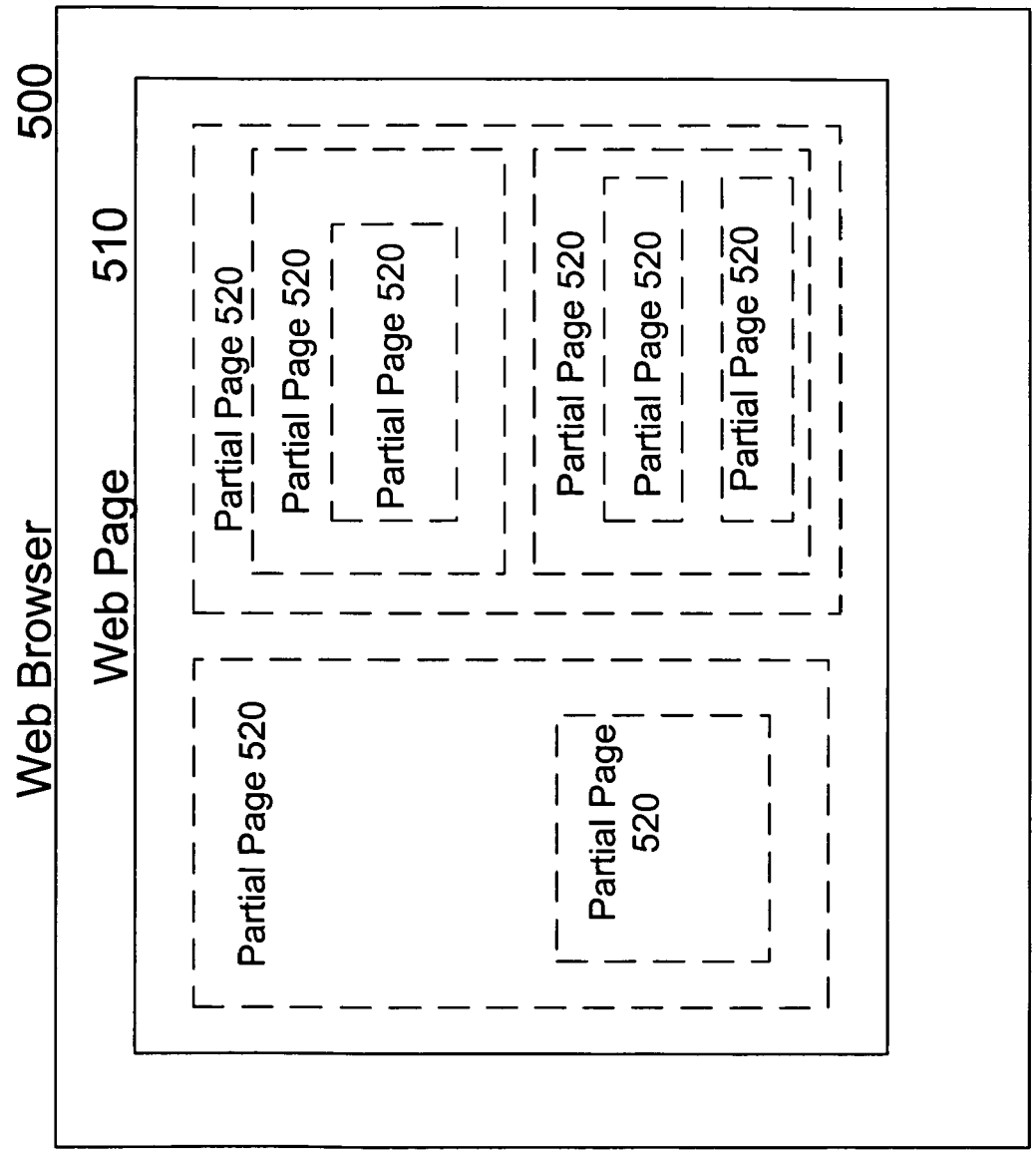
FIG. 5 illustrates an example of a Web page made up of nested partial pages in a Web Browser in one embodiment of the invention.

Page Proxies may be recursive, including the ability to track state on pages nested or embedded within one another. For example, a "single" page may consist of three frames, each having four frames that in turn contain ten parent tags with many children. FIG. 5 illustrates a Web page 510 in Web Browser 500 made up of nested partial pages 520. The state for all of these levels allows updates of content down to attributes of tags (meaning subtag elements). For each individual page, the corresponding page proxy may manage state for four separate levels or contexts, for example.

Tracking Cookie Identifiers

In a Web page that uses the Middleware technology of the present invention, cookies are the medium by which state is tracked. At the page level there is a cookie identifier (ID) with a corresponding cookie on the page proxy responsible for a given page. In addition, every data item on that page has a cookie ID with a corresponding cookie on the page proxy.

Each page proxy is responsible for passing state change information to its parent change queue. In one embodiment of the invention this may be accomplished, for example, using a change notification mechanism such as an event-based triggering mechanism. Other trigger mechanisms for notifying page proxies of state changes that are well known in the art may also be used. Though the described embodiment uses cookies to track data elements, alternative methods may also be used within the scope of the invention. Likewise, "cookie IDs" on the client side may take the form of server-relative Globally Unique Identifiers (GUIDs) in one embodiment, though the invention is not limited to such implementations.

Because the Internet connection between the server and the client is a stateless environment, whenever a change request is sent to the server, Middleware Module 420 uses the cookie ID to determine which Client Proxy 440 is responsible for the client sending the change request. Likewise the cookie ID allows Client Proxy 440 to locate a change queue and its associated Page Proxy 450.

This level of data tracking makes it possible for Client Proxy 440 to process all of the state changes on the change queues for all of Page Proxies 450 that are created as user interaction accesses the various levels of partial pages that make up the interface of an middleware Web application.

With cookie IDs, individual change queues can be associated with a Client Proxy representing a single client. This means that when the event trigger fires, Client Proxy 440 may send the associated Server Change Queue 460 to only the corresponding client. Change queues need only be sent to a client that is tracking a given data set of state changes.

Dynamic Tag Replacement through Proxy Pre-Parsing

HTML encompasses the notion of assigning a retrievable identity to a given tag (or other interface element). For example, you could have a paragraph tag <p>, and assign to it an ID such as <p id="Name1">, thus creating a unique ID for that particular paragraph in the HTML text. This is how traditional Web applications access a tag at runtime.

Embodiments of the present invention use a more dynamic method to access tags at runtime. The Middleware Module may pre-parse page definitions for Page Proxy creation at runtime. When the Middleware Module directs a Page Proxy to generate a page on the client for the first time, because of the pre-parsing, the Page Proxy may change the ID field in a tag from, for example, a string "Name1," to an numerical ID (for example, "22"). This changes the actual string ID to an ID that acts as a cookie (<p id="22">). This method allows the state context to be tracked.

The Middleware Module may recover tag level state changes from the actual page loaded on the client by tracking the data through a path that reflects the scope of the data. This means that the Middleware Module tracks the client proxy id, the page id and the tag id. This is expressed as a path (cid.pid.tid). This represents a unique identifier/resource locator to the middleware server module, but need not be available to the traditional Web server. There is an additional ID for the server that can be used in a multiple server deployment of an application, such as a server farm. In such a case, the server ID may be pre-pended to the path in the following manner: sid.cid.pid.tid. In this way a truly globally unique GUID ("cookie") may be created.

Tag ID Tracking

Dynamic element (e.g., tag) replacement represents the difference between design time and runtime processing. The string ID (in the example above "Name1") represents the class identification or design time identification of the tag <p>. The numeric ID ("22") represents the object instance identification, or runtime tag ID.

This aspect of the Middleware method of the present invention helps enable differentiation between a page as a class identifier or an instance identifier, and also supports incrementally updating a partial page, and tracking and updating individual tags in the context of a particular partial page. Typically a given tag instance ID (for example "22") remains unchanged for the life of the parent page instance. However, even if there are multiple instances of the same page on the server, there is never any confusion about the context of each individual paragraph tag numeric ID, even when the same tag is set to "22" on each of the page instances. Because the first tag of each page is offset from zero within the scope of the page, it is very possible to end up with two tags on two different page instances being set to the same numeric value (for example "22"). Because the page ID (pid) is a part of the path however, the Middleware method of the present invention can differentiate between the pages. Therefore, several corresponding tag instances on the same client proxy can have the same ID number, because they are differentiated by page ID.

Runtime Substitution of Numeric Tags

The flexibility of the Middleware method of the present invention means that even after a tag instance has been set to a numeric value, the part of the page in which the tag is located may be replaced or expanded as a result of state changes elsewhere. This means that a given tag's numeric ID may change at runtime. The Middleware Module may keep track of these changes.

In a page context, the uniqueness of the ID may be supported by the runtime assignment of incremental tag IDs. For example, suppose a page on the client is instantiated with only three tags in it. In the scope of the page, these tag IDs may be set to 0, 1, 2. Later, as a result of user interaction, the tag with the ID of "1" may be replaced with a tag that has another ten tag elements in it. Due to the incremental nature of tag ID replacement, the "1" may remain or change to "3" and the ten embedded tags would increment from there to 13, depending on the policies of the proxies involved. In most instances, the numeric value of "1" would not be reused in the life of the page. This is because, in this example, each page can increment tag IDs to a numeric value of 4,000,000,000 (4 billion). In the exceedingly unlikely event that the four billion mark was reached, the server would reallocate those numeric values that had previously been released. This level of numeric uniqueness ensures the correct tracking of tags throughout the Middleware method of the present invention.

Though the discussion above refers to the re-assignment of a tag name to a dynamic tag ID in numerical form, it will be understood that dynamic interface element ID renaming conventions apart from (or in addition to) sequential numeric IDs may be implemented as well.

Contextual Nature of Element Attributes

The method of the present invention derives its power to update very specific portions of an interface, such as a Web application interface in a browser, from the concept of element (e.g., tag) attribute context. In one or more embodiments of the invention, there are four levels of context affecting server-generated element updates: reference replacement, container element updating, element replacement, and sub-element updating.

Reference Replacement

Dynamic runtime replacement of references, such as hyper-links, is a novel feature of the Middleware method of the present invention. Assume there is an "A link" (e.g., <a id="blah"href=http://someurl.com?objid=11111>) and at runtime, the string identifier "blah" is changed to the numeric identifier "12"(<a id="12"href=http://someurl.com?objid=11111>). This provides the Middleware Module on the server with a direct path to the A link containing the URL http://someurl.com?objid=11111. In this case, the numeric A link ID of "12" is a reference to an object on the server. If the object on the server updates the server object ID (objid), for example, from objid11111 to objid22222, then this change may be added to the change queue and sent to the client. This is possible because the Middleware Module may track the numeric link ID "12". In such a case, the path needed to update the link would be cid.pid.tid, and the only portion of the A link that changes is the reference field. Still using the example above, this means that the A link updates to (<a id="12"href=http://someurl.com?objid=22222>). Or the URL may embody proxy references to elements changing on the server, which do not impact the redirection of the URL until the server component resolves the proxy value. With the method of the present invention, reference (e.g. link) replacement can really be thought of as reference updating.

Updating reference links in this way also makes it possible to update the current state of objects that contain entire sets of Web pages, not just a partial page. In other words, one may update an entire parent page by updating reference links. This update may not even occur on the client until the user clicks a link that causes an update. In a sense, this amounts to pre-fabricating the page before the user forces page retrieval. This relates to the next section describing container tag replacement or page embedding, which is based upon a virtual model.

Container Element Updating

Container element (e.g., tag) updating is the second context of element updates. Container element updating involves nesting elements such as tags inside one another, which is a way in which partial pages may be nested or embedded inside of a parent page. Such embedded partial pages can be incrementally updated at runtime. In this way a Middleware-based application interface within a browser may achieve the look and feel of a desktop application. Individual embedded partial pages update within a parent Web page based on runtime state changes sent from the server.

Suppose a paragraph tag (e.g., <p id="14"></p>) has multiple tags nested between the paragraph begin and end tag pair (<p id="14"><....><...></p>). The outermost paragraph tag pair that bracket other tags can be treated as a container for the other tags, not just as a delimiter of simple text. The contained tags can be of another type. For example, an iFrame or an embedded component like a Java applet, activeX control, input tag, etc., could be nested between simple paragraph tags.

It is possible to create enormously complex structures using this nesting method. It is similar to embedding tables inside of tables. Due to the dynamic nature of the partial page updating method of the present invention it is possible, for example, to have many tables embedded within one another, all of which could be replaced instantly with a single partial page update caused by some state change on the server that the Middleware Module tracks and propagates to the client dynamically. In summary, container element updating consists of an arbitrary element (e.g., tag) replacement of some larger part of the page, up to, but not including the whole page. Therefore, whole page updates do not occur in this context.

The power of this aspect of the method of the present invention is that state changes on the server may trigger changes in the type of an embedded partial (child) page on the client. Thus, heterogeneous page element replacement is easily accomplished dynamically at runtime. This means that a server state change vis-a-vis the type of the data referenced might result in an entirely different page context being displayed in a section of the parent page on the browser.

For example, suppose an embedded page graphically represents the current user in a business hierarchical context that includes several different user types, such as Chief Executive Officer (CEO), employee, employer, customer, etc. The user interface may display radically different views of radically different objects that dynamically change within the container page upon a container tag update. For example, an employee embedded page may require only a quarter of the computer screen's real estate to display, while a CEO type of embedded page may require three quarters of the screen.

Dependant on need, the DOM tree may be dynamically pruned and grafted at runtime as the Middleware Module of the present invention manages and propagates state changes. Partial page updating decouples the notion of a frame or a top level page from what drives changes in the DOM tree, and change and state tracking may occur in an automated fashion. With the method of the present invention, there is no need for HTML forms which require monolithic page updating.

Element Replacement

The third scope of element updating is element replacement (e.g., tag replacement in the Web browser context). Element replacement refers to replacement of an entire interface element (e.g., tag) with another type of interface element, for example, replacing a paragraph tag pair (<p></p>) with a bold tag pair (<b></b>). Element replacement in the context of tags may be broken down into three levels of updating: styles, attributes of a tag, and content of a tag (e.g., text or audio content replacement). This concept of levels of updating may be applied in other user interface contexts. The ramifications of entire element replacement have been covered in the section on container element updating.

Sub Element Updating

Sub element updating too has powerful ramifications for applications using the partial interface updating method of the present invention. In this case, state changes may be tracked and managed down to the level of interface element attributes. Attributes of a particular element may be bound to "stateful" information. Thus, when state changes in the server, the attributes of a particular interface element may be modified on the client as a result of those changes in state.

This may be supported, for example, by a tag level ID which identifies a tag (or other interface element) on which the attribute state changes are to be applied.

For example, changing a tag pair to bold (<b></b>) might act as a visual alarm alerting a user that the factory floor shut down for an unknown reason. Bold, red, and flashing are presentation (e.g., style) attributes developers using the partial page updating of the present invention can actually define and link to state changes on the server. Style names too can be mapped to data values on the server. Other sub-element (e.g., sub tag) attributes such as the width of a tag can also be changed. Items can become bigger or smaller based on state changes on the server. Show and Hide, for example, can be attributes on server objects in the method of the present invention.

Don'tSendImmediate

Don'tSendImmediate is an optional client side optimization, in one embodiment of the invention, which reduces the number of change queues sent to the server. At design time, a developer using an embodiment of the partial page updating method of the present invention can mark a field as Don'tSendImmediate. Without this optimization, whenever a user interacts with a field, a change queue is sent to the server. This can cause a great deal of needless overhead and use up communications bandwidth.

If a developer marks a field (for example, a type-in box) Don'tSendImmediate, that field's changes will not be sent to the server until a user interacts with another field that is marked as SendImmediate. At that time, the changes pertinent to both fields are sent to the server.

In addition, a user may change data previously entered in a Don'tSendImmediate field without adding another item to the change queue, further reducing bandwidth needs. Data changes of the same type and pertinent to the Don'tSendImmediate field that is already in the change queue may simply be updated. Some fields may enable data type changes (for example, selection versus deletion). In such a case, these two data types may be represented in the change queue by two different elements. Change items of identical types may overwrite the previous item in the queue.

Asynchronous User Interaction and MultipleSelect

Don'tSendImmediate can also be used advantageously in the context of a multiple selection scenario. For example, all of the selection management in the present invention may be accomplished asynchronously. This means that a user can continue to interact with items in the partial page during the time that the change queue from the first selection is sent to the server and the server responds. If a user multiply selects several items in rapid succession, the subsequent selections may be displayed on the screen immediately, and then either appended to the change queue, or replace the items previously added to the change queue as soon as the selection process ends. When the server response to the first selection returns to the client, the last set of selection commands may be placed in the change queue and sent to the server.

Thus, a visual display may occur asynchronously to the server update. The server need not update the selection until the user finalizes a multiple selection. Only at that point may the change queue be sent to the server. In this way, client/server communications are optimized.

Thus, a method and apparatus for partial page updating of a Web page both on the browser-client and Web server is described.

We claim:

1. A method for providing partial updating between a server and a client interface context, comprising:

providing a client interface context with an interface container from a server;

tracking a state of a plurality of interface elements in said interface container;

determining one or more client-based changes to one or more of said interface elements;

queuing the one or more client-based changes to the one or more interface elements in a client-side change queue;

communicating said one or more client-based changes in said client-side change queue to said server to change said server state; and based on a server state, determining one or more server-based changes to one or more of said interface elements;

queuing the one or more server-based changes to the one or more interface elements in a server-side change queue; and applying said one or more server-based changes from said server-side change queue to said one or more interface elements in said client interface context.

2. The method of claim 1, wherein tracking said state comprises: maintaining a reference to one or more of said plurality of interface elements.

3. The method of claim 2, wherein maintaining said reference comprises:

maintaining a client reference to a respective client interface context;

maintaining a container reference to a respective interface container loaded in said respective client interface context; and maintaining an element reference to a respective interface element in said respective interface container.

4. The method of claim 3, wherein maintaining an element reference to a respective interface element comprises: replacing a design-time identifier of said respective interface element with a dynamic identifier.

5. The method of claim 1, further comprising: interfacing with one or more service applications to determine said server-based changes.

6. The method of claim 1, further comprising:

associating a client proxy with said client interface context in response to a request for said interface container from said client interface context;

associating a container proxy with said interface container in said client interface context; and associating one or more element proxies with one or more of said interface elements.

7. The method of claim 6, further comprising:

placing a client proxy cookie in said client interface context;

placing a container proxy cookie in said client interface context; and placing an element proxy cookie in said interface container.

8. The method of claim 1, wherein applying a server-based change to one of said interface elements comprises replacing a reference in said interface element.

9. The method of claim 1, wherein applying a server-based change to one of said interface elements comprises changing a container element.

10. The method of claim 1, wherein applying a server-based change to one of said interface elements comprises replacement of said interface element.

11. The method of claim 10, wherein said replacement comprises updating an attribute of said interface element.

12. The method of claim 11, wherein said attribute comprises a presentation attribute of said interface element.

13. The method of claim 10, wherein said replacement comprises content replacement.

14. The method of claim 1, further comprising tracking the scope of said client-based changes to said interface elements through a context path reflecting said scope, wherein the item or items in said client-side change queue convey said client-based changes and said scope based on said context path.

15. The method of claim 14, wherein said item or items in said client-side change queue comprise conveying said client-based changes and said scope based on said context path in varying levels of granularity ranging from whole page updates to updates at the sub tag level, depending on said scope of said changes.

16. The method of claim 1, further comprising tracking the scope of said server-based changes to said interface elements through a context path reflecting said scope, wherein the item or items in said server-side change queue convey said server-based changes and said scope based on said context path.

17. The method of claim 16, wherein said item or items in said server-side change queue comprise conveying said server-based changes and said scope based on said context path in varying levels of granularity ranging from whole page updates to updates at the sub tag level, depending on said scope of said changes.

18. The method of claim 1, wherein providing said partial updating between a server and a client interface context further comprises embedding many partial pages within one another to create levels of granularity and state change responsiveness from whole pages down to the sub tag level.

19. The method of claim 1, wherein providing said partial updating between a server and a client interface context further comprises directly manipulating the HTML and the DOM on the client browser to apply said server-based changes to said interface elements.

20. The method of claim 1, wherein determining one or more server-based changes comprises analyzing the one or more client-based changes.

21. An apparatus comprising:
a client interface context, said client interface context comprising an interface container having a plurality of interface elements, wherein said client interface context is configured to present an interface based on said interface container, and wherein said client interface context is configured to update a portion of said interface when a state of an associated interface element is changed;
a client-side change queue comprising one or more client-side changes of one or more of said interface elements for transmission to said server;
a server configured to serve said interface container, said server comprising a plurality of server element proxies respectively associated with said plurality of interface elements and a server-side change queue comprising one or more server-based changes to said plurality of interface elements for transmission to said client interface context; and
wherein each server element proxy is configured to track a respective interface element state, and wherein each server element proxy is configured to process server-side changes from the server-side change queue directed to said respective interface element state.

22. The apparatus of claim 21, wherein at least one of said interface elements comprises a container element having one or more additional interface elements nested therein.

23. The apparatus of claim 21, further comprising a user interface (UI) application providing said client interface context.

24. The apparatus of claim 21, further comprising a web browser providing said client interface context; and wherein said interface container comprises a web page, and said plurality of interface elements comprise one or more tags.

25. The apparatus of claim 21, wherein at least one of said plurality of interface elements comprises a nested interface container.

26. The apparatus of claim 21, wherein said server further comprises: a client proxy associated with said client interface context; and a container proxy associated with said interface container.

27. The apparatus of claim 21, wherein the state of one or more of said interface elements is stored in said interface container.

28. The apparatus of claim 21, wherein the state of one or more of said interface elements is stored in each respective interface element.

29. The apparatus of claim 21, further comprising a client module configured to receive said server-based changes, and cause said server-based changes to be applied to corresponding interface elements.

30. The apparatus of claim 29, wherein said client module is further configured to track client-based changes to said interface elements for transmission to said server.

31. The apparatus of claim 21, wherein said server comprises a middleware module configured to interface with one or more back-end services.

* * * * *